US007897266B2

(12) United States Patent
Everett, Jr. et al.

(10) Patent No.: US 7,897,266 B2
(45) Date of Patent: Mar. 1, 2011

(54) PERSONAL GROOMING DEVICE HAVING A TARNISH RESISTANT, HYPOALLERGENIC AND/OR ANTIMICROBIAL SILVER ALLOY COATING THEREON

(75) Inventors: David W. Everett, Jr., Verona, WI (US); Maciej Murzynski, Verona, WI (US); Timothy John Martin, Dodgeville, WI (US); Giovanni Gonzalez, Sun Prairie, WI (US)

(73) Assignee: Rovcal, Inc., Madison, WI (US)

(*) Notice: Subject to any disclaimer, the term of this patent is extended or adjusted under 35 U.S.C. 154(b) by 810 days.

(21) Appl. No.: 11/673,250

(22) Filed: Feb. 9, 2007

(65) Prior Publication Data

US 2008/0189952 A1 Aug. 14, 2008

(51) Int. Cl.

| | |
|---|---|
| ***B32B 15/04*** | (2006.01) |
| ***B26B 19/00*** | (2006.01) |
| ***B26B 19/38*** | (2006.01) |
| ***B26B 21/58*** | (2006.01) |
| ***B26B 21/60*** | (2006.01) |

(52) U.S. Cl. ....................... 428/673; 428/687; 428/217; 428/336; 132/162; 30/32; 30/45; 30/50; 30/78; 30/346.5; 30/346.53

(58) Field of Classification Search ................. 428/673, 428/687, 220, 217, 332, 336

See application file for complete search history.

(56) References Cited

U.S. PATENT DOCUMENTS 2,471,855 A 5/1949 Bird
2,927,052 A 3/1960 Moudry
3,064,348 A 11/1962 Wahl
3,811,876 A * 5/1974 Harigaya et al. ............ 420/504
4,138,811 A 2/1979 Chauvy
4,411,041 A * 10/1983 Braga ........................ 15/167.1
4,933,178 A 6/1990 Capelli
5,180,585 A 1/1993 Jacobson et al.
5,405,644 A 4/1995 Ohsumi et al.
5,673,711 A 10/1997 Andrews
5,681,575 A 10/1997 Burrell et al.
5,753,251 A 5/1998 Burrell et al.
5,770,255 A 6/1998 Burrell et al.
5,817,195 A * 10/1998 Davitz ........................ 148/430

(Continued)

FOREIGN PATENT DOCUMENTS

EP 1642562 4/2006

(Continued)

OTHER PUBLICATIONS

International Search Report dated Jul. 18, 2008 (PCT/US2008/053155).

*Primary Examiner*—Michael La Villa
(74) *Attorney, Agent, or Firm*—Armstrong Teasdale LLP

(57) ABSTRACT

The present disclosure is generally directed to a personal grooming product or device (e.g., foil shaver, rotary shaver, etc.) having a metal coating on one or more surfaces thereof, the grooming product being designed for contacting the skin (e.g., the human hand or face, or the skin of an animal, such as during the act of pet grooming). More specifically, the present disclosure is directed to a personal grooming product or device having a layer of some measurable thickness on such a surface, wherein the layer comprises or contains a tarnish resistant, hypoallergenic and/or antimicrobial silver-containing alloy.

27 Claims, 6 Drawing Sheets

U.S. PATENT DOCUMENTS

| | | | | |
|---|---|---|---|---|
| 5,983,756 | A | 11/1999 | Orloff | |
| 6,009,589 | A * | 1/2000 | Driesen et al. | 15/167.1 |
| 6,273,973 | B1 * | 8/2001 | Parayil et al. | 148/542 |
| 6,923,990 | B2 | 8/2005 | Capelli | |
| 2002/0166188 | A1 * | 11/2002 | Driesen et al. | 15/192 |
| 2002/0185199 | A1 | 12/2002 | Myers et al. | |
| 2004/0088812 | A1 | 5/2004 | Weihrauch | |
| 2004/0211018 | A1 | 10/2004 | Canton et al. | |
| 2004/0223944 | A1 * | 11/2004 | Capelli | 424/78.1 |
| 2005/0186107 | A1 * | 8/2005 | Davitz | 420/504 |
| 2006/0042036 | A1 | 3/2006 | Quinn et al. | |
| 2006/0143924 | A1 | 7/2006 | Mercurio | |
| 2008/0166260 | A1 * | 7/2008 | Faverjon et al. | 420/503 |

FOREIGN PATENT DOCUMENTS

| | | | |
|---|---|---|---|
| JP | 6154030 | | 6/1994 |
| JP | 10262856 | | 10/1998 |
| WO | WO 03/059117 | * | 7/2003 |
| WO | WO 2004/112986 | * | 12/2004 |
| WO | 2006106282 | | 10/2006 |

* cited by examiner

PERSONAL GROOMING DEVICE HAVING A TARNISH RESISTANT, HYPOALLERGENIC AND/OR ANTIMICROBIAL SILVER ALLOY COATING THEREON

FIELD OF THE DISCLOSURE

The present disclosure is generally directed to a personal grooming product or device (e.g., foil shaver, rotary shaver, clipper or groomer, etc.) having a metal coating on one or more surfaces thereof, the grooming product being designed for contacting the skin in some way (e.g., the skin of the human hand or face, or the skin of an animal, such as during the act of pet grooming). More specifically, the present disclosure is directed to a personal grooming product or device having a layer of some measurable thickness on such a surface, wherein the layer includes or contains a tarnish resistant, hypoallergenic and/or antimicrobial silver-containing alloy.

BACKGROUND OF THE DISCLOSURE

Silver ions and silver compounds are recognized to have a toxic effect on some bacteria, viruses, algae and fungi that is typical for heavy metals like lead or mercury, but without the toxicity to humans that is typically associated with heavy metals like these. For example, silver has been shown to kill many microbial organisms in vitro (i.e., in a test tube or a petri dish). The antimicrobial properties of silver are believed to be due to an oligodynamic effect, in which silver ions denature proteins (e.g., enzymes) of the target cell or organism by binding to reactive groups or sites therein, resulting in their precipitation and inactivation. Silver may inactivate enzymes, for example, by reacting with the sulfhydryl groups therein to form silver sulfides. Silver may also react with the amino-, carboxyl-, phosphate-, and imidazole-groups therein to diminish the activities of lactate dehydrogenase and glutathione peroxidase. Bacteria (gram-positive and gram-negative) are in general affected by the oligodynamic effect, but some species can develop a silver-resistance.

In view of the known antimicrobial properties of silver, there has been great interest in using silver in a number of commercial products in order to impart these antimicrobial properties to those products. More recently, this interest has focused on the use of silver in the form of nano-particles, silver colloids, and/or particles of silver salts, in, for example, coatings applied to the surface of consumer products such as cell phones, clothing items (e.g., shirts, socks, insoles and undergarments), toothbrushes and tooth pastes, soaps, shampoos, facial creams, and internal washing drum of clothes washers. These very small particles of silver are believed to be even more effective at repelling or killing bacteria, viruses, etc., that come into contact with these surfaces.

Although silver has a number of advantages, it does have some limitations. For example, silver and silver-containing coatings are known to tarnish, resulting in an unfavorable appearance on the surface of the product to which it is applied. In addition, some silver-containing coatings may have a concentration of nickel therein that is sufficient to cause allergic reactions to the skin of some individuals who come into contact with these silver-coated product surfaces, or may fail to act as a sufficient barrier between the user's skin and nickel present on the component upon which the coating has been applied. Accordingly, a need continues to exist for a silver-containing coating that is more resistant to tarnishing, that is less likely to result in triggering an allergic reaction to the human skin or is a more effective barrier to nickel migration therethrough (i.e., is hypoallergenic), and yet still possesses a high level of antimicrobial effect.

SUMMARY OF THE DISCLOSURE

Briefly, therefore, the present disclosure is directed to a personal grooming device, such as a razor or shaver (e.g., an electric shaver, such as a rotary or foil shaver), or a clipper or groomer (e.g., an electric clipper or groomer), the device including a component (e.g., a cutting blade, a foil or screen present between the cutting blade and the user's skin, the clipper or groomer comb, or the fixed or reciprocating blade thereof, etc.), having a coating on a surface thereof which is designed for contacting the skin, said coating including an alloy having a concentration of silver of at least about 50 weight percent, based on the total weight of the alloy.

In one particular embodiment, the present disclosure is directed to a shaver including a metal shaver component (e.g., a metal cutting blade, a metal foil or screen, etc.) having a coating on a surface thereof which is designed for contacting skin, said coating including an alloy having a concentration of silver of at least about 50 weight percent, based on the total weight of the alloy.

In another particular embodiment, the present disclosure is directed to an electric shaver including: (i) a cutting assembly having a rotary shaving head, a guard ring, and a rotary cutting blade; and, (ii) a surface coating deposited on a portion of a surface of at least one of the rotary shaving head, the guard ring, and the rotary cutting blade, for contacting the skin, wherein the surface coating includes an alloy having a concentration of silver of at least about 50 weight percent, based on the total weight of the alloy. Optionally, the shaver may additionally or alternatively include a trimmer wherein the fixed and/or reciprocating blade thereof has such a surface coating.

In yet another particular embodiment, the present invention is directed to an electric shaver including: (i) an outer cutter assembly having an outer cutter foil; (ii) an inner cutter assembly having an inner cutter; and, (iii) a surface coating deposited on a portion of a surface of at least one of the outer cutter foil and the inner cutter for contacting the skin, wherein the surface coating includes an alloy having a concentration of silver of at least about 50 weight percent, based on the total weight of the alloy. Optionally, the shaver may additionally or alternatively include a trimmer wherein the fixed and/or reciprocating blade thereof has such a surface coating.

In yet another particular embodiment, the present disclosure is directed to a clipper or groomer (e.g., an electric clipper or groomer) having: (i) a cutting assembly including a fixed blade, a reciprocating blade, and optionally a comb or guide attached to said fixed blade; and, (ii) a surface coating deposited on a portion of a surface of at least one of the fixed blade, the reciprocating blade, and the comb or guide attached to said fixed blade for contacting the skin, wherein the surface coating includes an alloy having a concentration of silver of at least about 50 weight percent, based on the total weight of the alloy.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
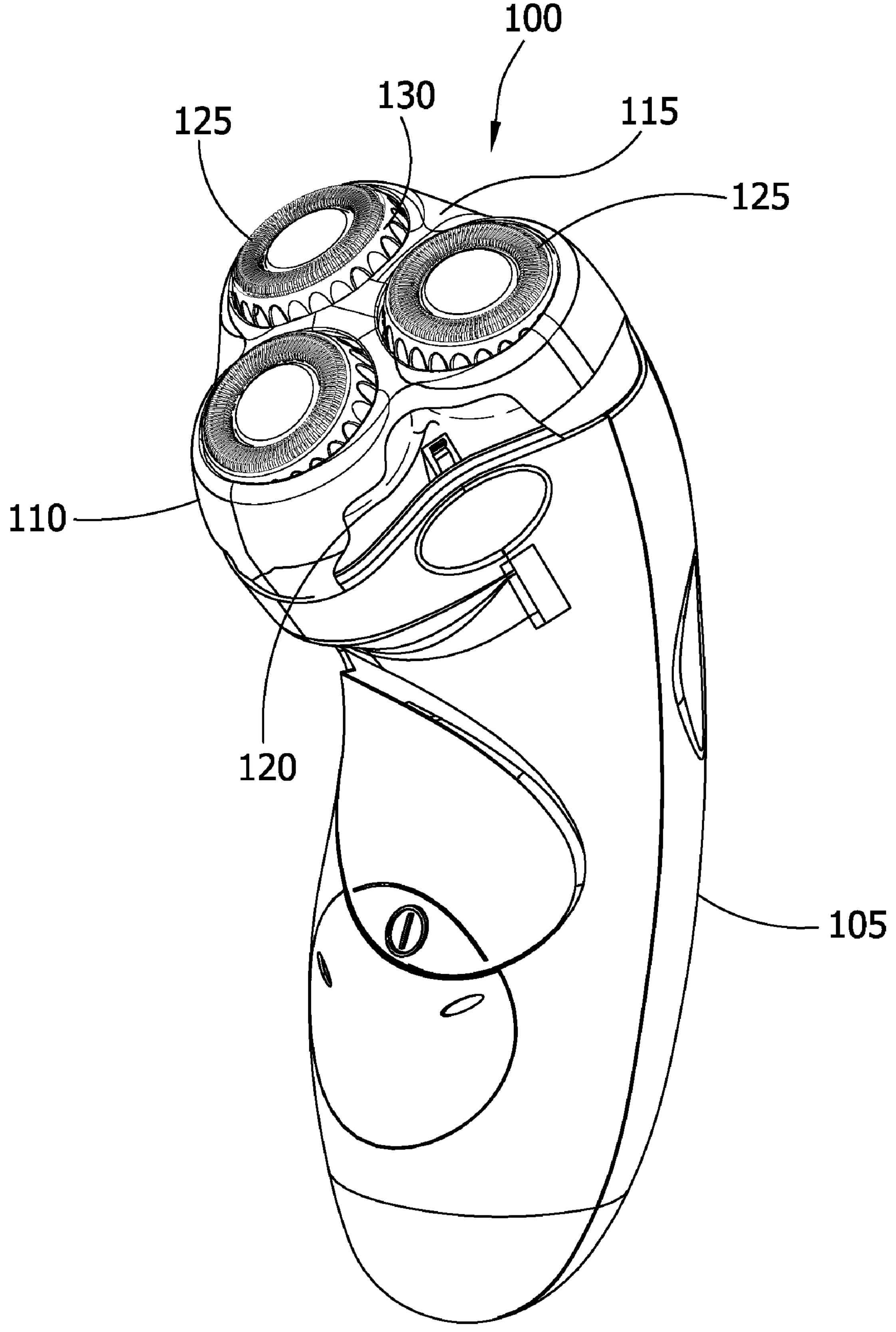
FIG. 1 is a perspective view of an exemplary electric rotary shaver.

In accordance with the present disclosure, it has been discovered that a personal grooming device, such as a razor or shaver (e.g., an electric shaver, such as a rotary or foil shaver), or a clipper or groomer (e.g., an electric clipper or groomer), may be prepared that includes a component (e.g., a metal or metallic component, such as a cutting blade, a foil or screen present between the cutting blade and the skin, the clipper or groomer comb, or the fixed or reciprocating blade thereof, etc.) that has a silver-containing coating on a surface thereof which is designed for contacting the skin (e.g., the user's skin), wherein said coating (i) has anti-microbial properties, (ii) is tarnish resistant, and/or (iii) is hypoallergenic. Advantageously, such a coating may additionally or optionally impart a reduced coefficient of friction to the surface of which it is applied. For example, when applied to the surface of a cutting blade, or to a foil or screen present between the cutting blade and the skin, the coated surface may have less friction against the user's skin as compared to the non-coated surface, thus, for example, reducing redness and/or irritation to the user's skin.

With respect to the reduced coefficient of friction of a coated surface of a metallic component, prepared in accordance with the present disclosure, it is to be noted that such a surface may exhibit a coefficient of friction that is at least about 20%, at least about 30%, or even at least about 40%, less than the coefficient of friction of a non-coated surface of an otherwise identical metallic component.

In one particular embodiment, the coating is a silver-containing alloy having a concentration of silver therein of at least about 50 weight percent, based on the total weight of the alloy, as further detailed herein below. In this or another embodiment, the coating is formed by vapor deposition. The vapor deposition method may be physical vapor deposition (PVD) or chemical vapor deposition (CVD) and is performed in a way that maintains the integrity of the initial device component onto which the coating is being deposited. Without being held to any particular theory, it is generally believed that such methods act to deposit, in this instance, silver atoms onto the surface of the component being coated.

In this regard it is to be noted that, with respect to the "tarnish resistant" aspect of the coating, the present disclosure is directed to a coating that includes a silver-containing alloy, and more particularly a sterling silver alloy, which exhibits greater resistance to sulfidation and/or oxidation, as compared, for example, to conventional sterling silver alloys (as detailed, for example, in PCT Published Application No. WO 2006/106282, the entire content of which is incorporated herein by reference for all relevant purposes consistent with the present disclosure).

It is to be further noted that, with respect to the "hypoallergenic" aspect of the coating, the present disclosure is directed to a coating that includes a silver-containing alloy which has little or no nickel therein; that is, the coating has a nickel concentration that is sufficiently low (e.g., less than about 1 weight percent, less than about 0.1 weight percent, less than about 0.05 weight percent, or even less than about 0.01 weight percent). Additionally, or alternatively, the present disclosure is directed to such a hypoallergenic coating that acts a barrier between the component to which it is applied and the user's skin, such that little or no nickel is able to migrate therethrough and contact the user's skin, as further detailed herein below. Accordingly, the coating yields a component that conforms, for example, to European Nickel Directive 94/27/EC.

It is to be still further noted that, with respect to the "anti-microbial" aspect of the coating, the present disclosure is directed to a coating that includes a silver-containing alloy that kills at least about 99% (e.g., about 99.9% or even about 99.99%) of commonly-occurring organisms (e.g., bacteria, viruses and/or fungi), as determined in accordance, for example, with the methodology of ASTM E2180-01, and/or in conformance with the minimum efficacy requirement of Japanese International Standard (JIS) Z-2801:2000.

1. Personal Grooming Components for Coating

As previously noted, the present disclosure is directed to a silver-containing alloy suitable for use in coating a surface of one or more components of a personal grooming device that are designed to come into contact with the skin (e.g., the human skin, or the skin of an animal). In one particular embodiment, the present disclosure is directed to a shaver, such as a conventional rotary or foil shaver, or alternatively a clipper or groomer (including for example a pet clipper or groomer), which includes one or more components having a silver-containing alloy coating present on a surface thereof that is designed for contacting the skin. In this or another particular embodiment, the shaver or clipper component is a metal component, wherein at least a portion of the surface thereof (e.g., at least about 50%, at least about 75%, at least about 85%, at least about 95%, or at least about 100% of the surface area thereof) that is designed for contacting the skin has a silver-containing alloy deposited thereon. Such components may be selected from, for example, a rotary shaving head, a guard ring, and/or a rotary cutting blade in a rotary shaver; an outer cutting foil, the inner cutter and/or a trimmer in a foil shaver; and the fixed or reciprocating blades of a clipper or groomer.

More specifically, it is to be noted that, in one particular embodiment, the present disclosure is directed to a coated shaver component suitable for use in a rotary shaver, such as the one detailed further herein below, and/or as described in U.S. Patent Application Publication No. 2006/0042036 (the entire content of which is hereby incorporated by reference for all relevant purposes consistent with the present disclosure). In this regard it is to be noted, however, that the rotary shaver may be other than herein described without departing from the scope of the present invention.

Referring now to FIG. 1, a rotary shaver 100 generally includes, among other features, a handle portion 105 housing various operating components of the shaver, such as a motor (not illustrated) and suitable drive gear (not illustrated) and a cutting assembly (generally indicated at 110), the cutting assembly being releasably connected to the handle portion 105. The handle portion 105 is typically made from a plastic material. The cutting assembly 110 of the illustrated rotary shaver 100 particularly includes a support frame 115 that is releasably connected to the handle portion 105 of the shaver and together with the handle defines an interior hair pocket 120 (broadly, an interior void space of the shaver), in which hair clippings are collected during shaving.

Rotary shaving heads 125 (broadly, the outer cutting members of the shaver), which are typically made of, for example, stainless steel, are in the form of circular or cup-shaped foils having openings therein for hair to enter into. These rotary shaving heads are set within, and extend outward of, the support frame 115, and the outer surfaces thereof are designed for contacting the user's skin during shaving. The rotary shaving heads 125 also, in part, define the hair pocket 120. A guard ring 130 encircles the annular sidewall of each rotary shaving head 125 and is in contact therewith, along with the support frame 115. The guard rings 130 are typically made of, for example, a thermoplastic material or metal. Suitable rotary cutting blades (not illustrated), or more broadly, inner cutting members of the shaver, are typically made of, for example, 300 or 400 series stainless steel, or nickel foil with greater than about 90% nickel content. The cutting blades are disposed within the hair pocket in abutting but slidable relationship with the interior surfaces (sometimes also referred to as the track surfaces) of the respective rotary shaving heads 125. The rotary cutting blades are drivingly connected to the shaver motor via the drive gear, for being rotatably driven relative to the shaving heads 125.

In operation of the shaver 100, as the outer surfaces of the rotary shaving heads 125 are moved by the user over the surface of the skin (e.g., facial skin), hairs (e.g., whiskers) enter openings in the shaving heads and extend into the hair pocket 120. As the rotary cutting blades rotate relative to the inner surfaces of the rotary shaving heads 125, the shearing action between the cutting blades and the edges of the shaving heads at the openings thereof shears the hairs that extend through the openings in the shaving heads.

In accordance with the present disclosure, a coating having a silver-containing alloy may be applied to the outer surface (i.e., the surface designed to contact the skin) of, for example, the cutting blades, shaving heads 125, guard rings 130, and/or some other component that may contact the skin (e.g., the support frame 115). As previously noted, such a coating may be applied in order, for example, to impart antimicrobial properties thereto, and/or to enhance the tarnish resistance and/or to reduce facial drag (thereby increasing the user's comfort during operation) of the component. In addition, the coating may provide a user with a protective barrier between the substrate reactive material (e.g., nickel, if present, for example, in the cutting blades, the shaving heads 125 and/or the guard rings 130) and the skin.

It is to be noted that the construction and/or operation of the rotary shaver 100 as described heretofore is generally known to those of ordinary skill in the art and, therefore, need not be described in further detail except to the extent necessary to set forth the present invention. It is to be further noted that the construction and/or operation may be other than herein described without departing from the scope of the present invention.

In an alternative embodiment, the present disclosure is directed to a coated shaver component suitable for use in a foil shaver, such the one detailed further herein below, and/or as described in U.S. Patent Application Publication Nos. 2006/0042036 and 2006/0143924 (the entire contents of which are hereby incorporated by reference for all relevant purposes consistent with the present disclosure). In this regard it is to be noted, however, that the foil shaver may be other than herein described without departing from the scope of the present invention.

Figure 2:
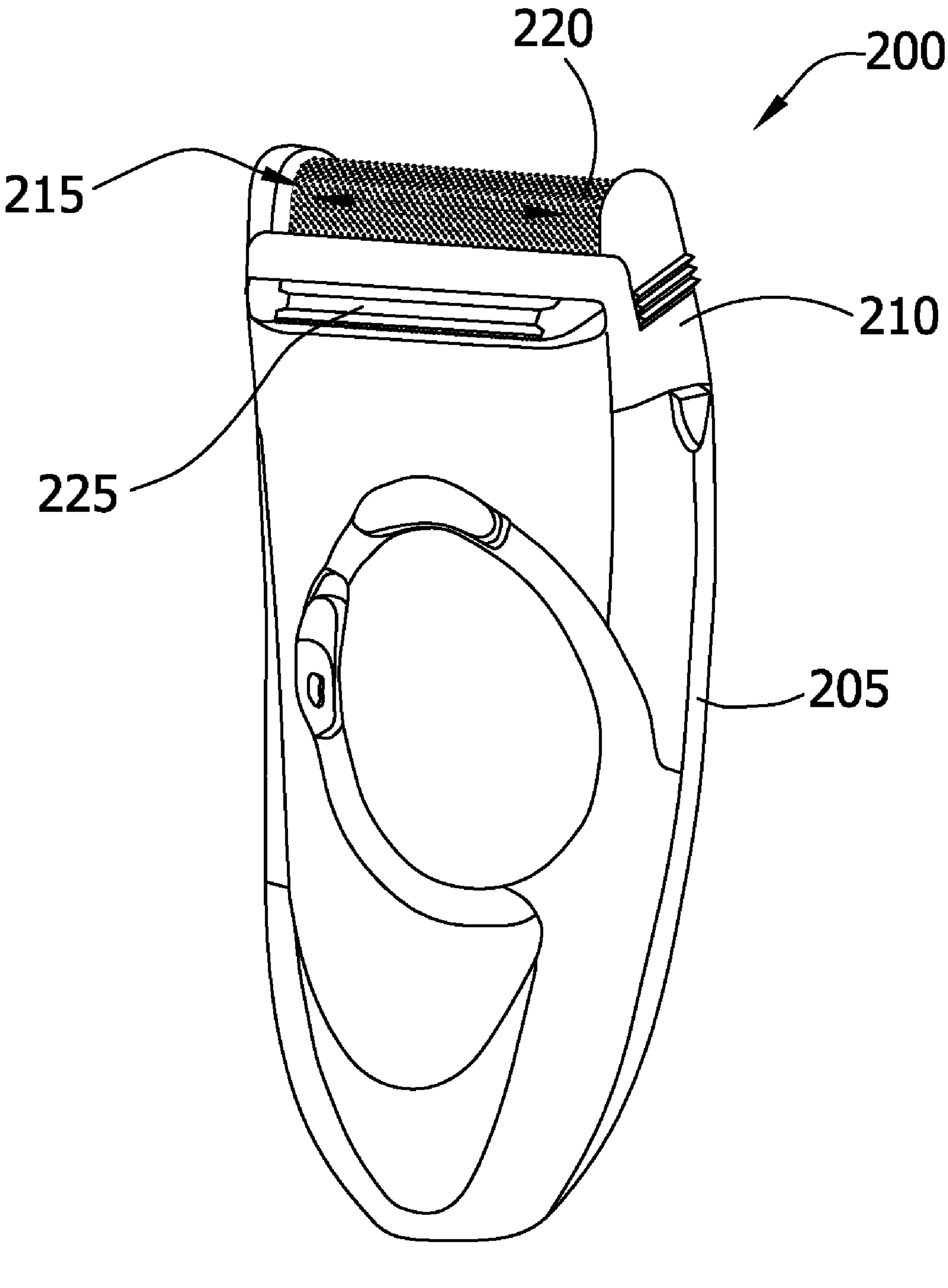
FIG. 2 is a perspective view of an exemplary electric foil shaver.

Referring now to FIG. 2, an electric foil-type shaver constructed in accordance with an alternative embodiment of the present disclosure is indicated generally at 200. The shaver 200 generally includes a housing 205 and a guard cover 210 releasably mounted thereon to permit removal of the guard cover 210 for accessing various components of the shaver for cleaning and/or replacement purposes. The shaver 200 further includes a single shaving head, generally indicated at 215, but may instead include two or more shaving heads as is known in the art without departing from the scope of this disclosure. The shaving head 215 includes an elongate outer cutter 220 formed (e.g., bent) into a generally arcuate shape (in lateral cross-section) and mounted on the guard cover 210 of the shaver. The shaver 200 further includes a trimmer 225, which included fixed and reciprocating blades (not illustrated).

Figure 3:
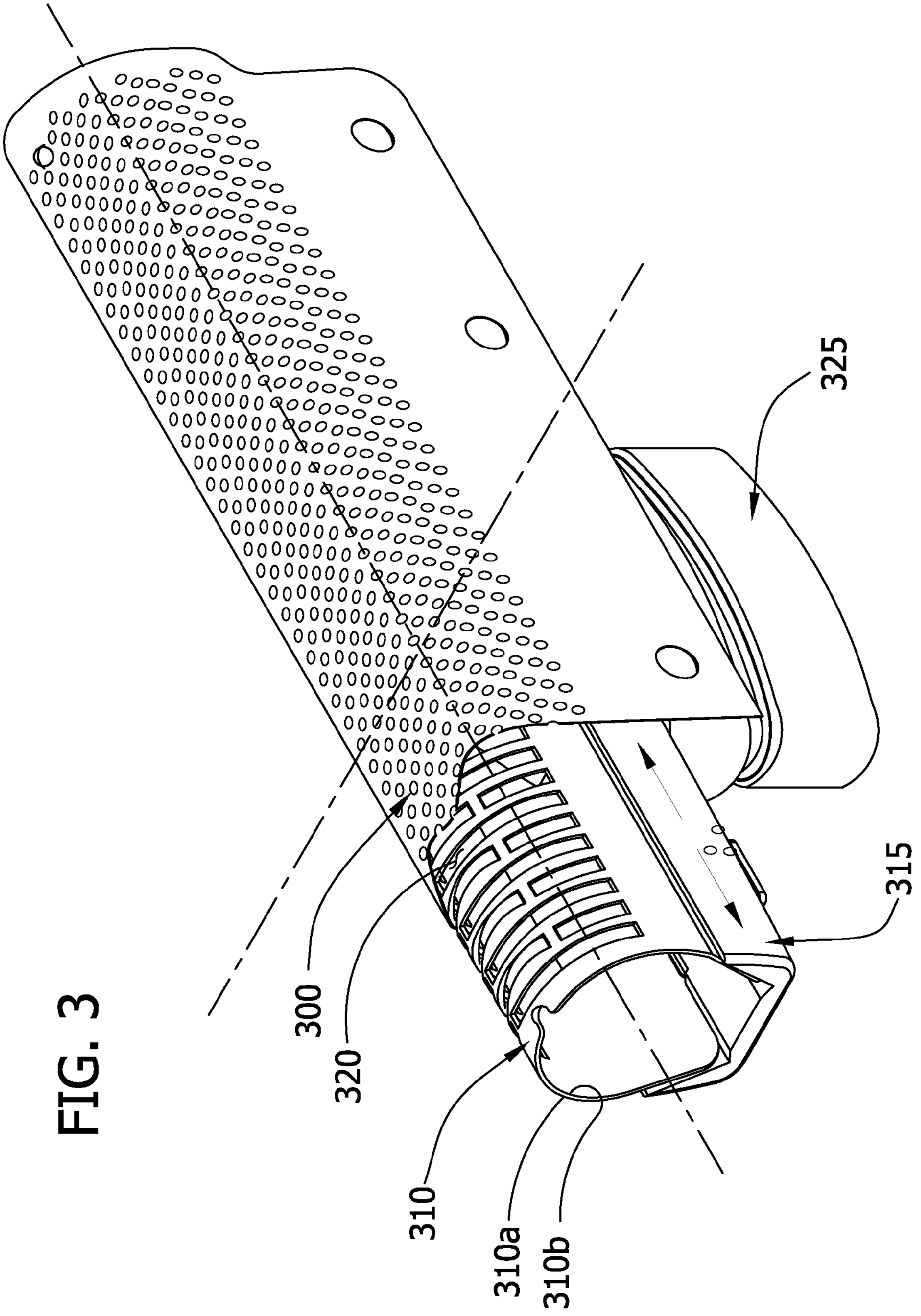
FIG. 3 is a perspective view of a portion of the exemplary shaver illustrated in FIG. 2 with additional portions cut away to reveal the internal construction thereof.
Figure 4:
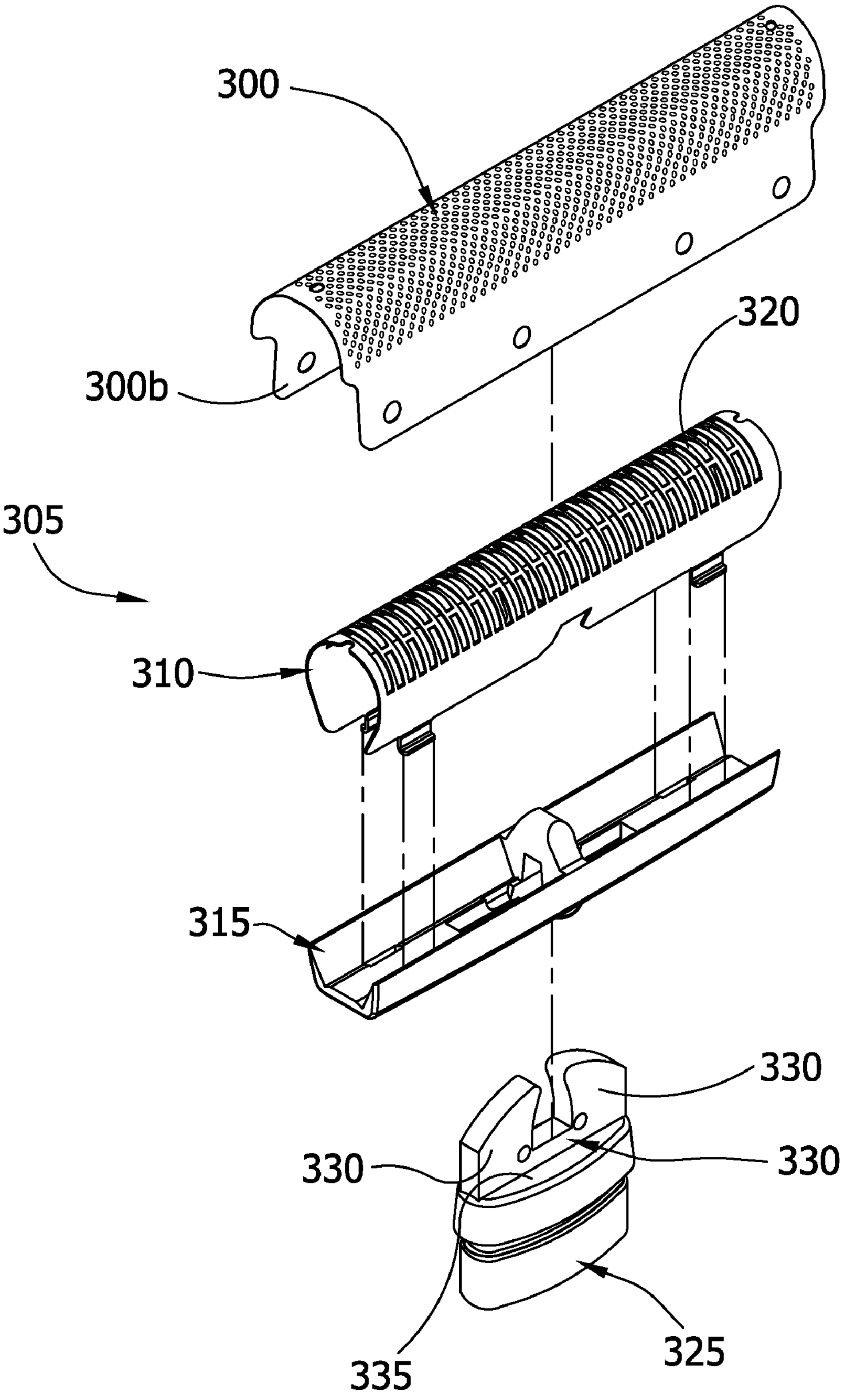
FIG. 4 is an exploded perspective view of the portion of the exemplary shaver illustrated in FIG. 2.

As illustrated in further detail in FIGS. 3 and 4, the outer cutter 300 suitably includes a thin, flexible apertured foil or mesh screen. As an example, the outer cutter 300 may suitably have a thickness between about 25 microns and about 100 microns, between about 50 microns and about 95 microns, or between about 60 and about 90 microns (a portion of which may be accounted for by the coating of the present disclosure, when present). However, the outer cutter 300 thickness may be greater or less than the above range and remain within the scope of this invention. The outer cutter 300, being a component in direct contact with the skin during operation, is particularly suitable for coating with the silver-containing alloy of the present disclosure (i.e., coating the outer surface, or the surface designed to contact the skin, with the silver-containing alloy), as further detailed elsewhere herein.

An inner cutter assembly 305 of the shaving head 215 (FIG. 2) extends longitudinally within the guard cover 210 (FIG. 2) in contact with the inner surface 300*b* of the outer cutter 300 and is drivingly connected to a motor (not illustrated) disposed within the housing for reciprocating movement relative to the outer cutter in a side-to-side direction as indicated by the direction arrows in FIGS. 2 and 3. The inner cutter assembly 305 of the illustrated embodiment has an elongate inner cutter 310 mounted on a carriage 315. The inner cutter 310 has a thin, flexible apertured foil or mesh screen formed (e.g., bent) into an arcuate shape (in lateral cross-section) that is generally similar to the arcuate shape of the outer cutter 300. The inner cutter 310 has an outer surface 310*a* in contact with the inner surface 300*b* of the outer cutter 300, and an inner surface 310*b*. In one embodiment, the inner cutter 310 is suitably thicker than the outer cutter 300. For example, the inner cutter 310 may have of thickness of about 150 microns to about 400 microns, or about 175 microns to about 350 microns, or about 200 microns to about 300 microns (this thickness including the thickness of the silver-containing alloy coating, when present thereon). However, it is contemplated that the thickness of the inner cutter may be greater or less than the above thickness ranges without departing from the scope of this disclosure.

The inner cutter 310 is suitably made by forming the apertures in a flat sheet of metal (e.g., stainless steel). The apertures may be formed with positive rake angle cutting edges (e.g., the intersection of each aperture with the outer surface 310*a* of the inner cutter 310 defines an acute angle). In one suitable embodiment, the apertures of the inner cutter 310 include a plurality of elongate slots 320, as illustrated in FIGS. 3 and 4. However, the apertures of the inner cutter 310 can have virtually any shape and can be arranged in virtually any pattern without departing from the scope of the invention. According to the present disclosure, the inner cutter 310 may be plated with the silver-containing alloy coating (as further detailed elsewhere herein).

A drive member, generally indicated at 325, is drivingly connected to the motor in the housing of the shaver 200 and has a connecting end 330 that extends longitudinally outward of the housing for driving connection with the inner cutter assembly 305 to drivingly connect the inner cutter assembly with the motor. The connecting end 330 of the drive member 325 includes opposing arms 330 extending out from a base 335 of the connecting end in spaced relationship.

Figure 5:
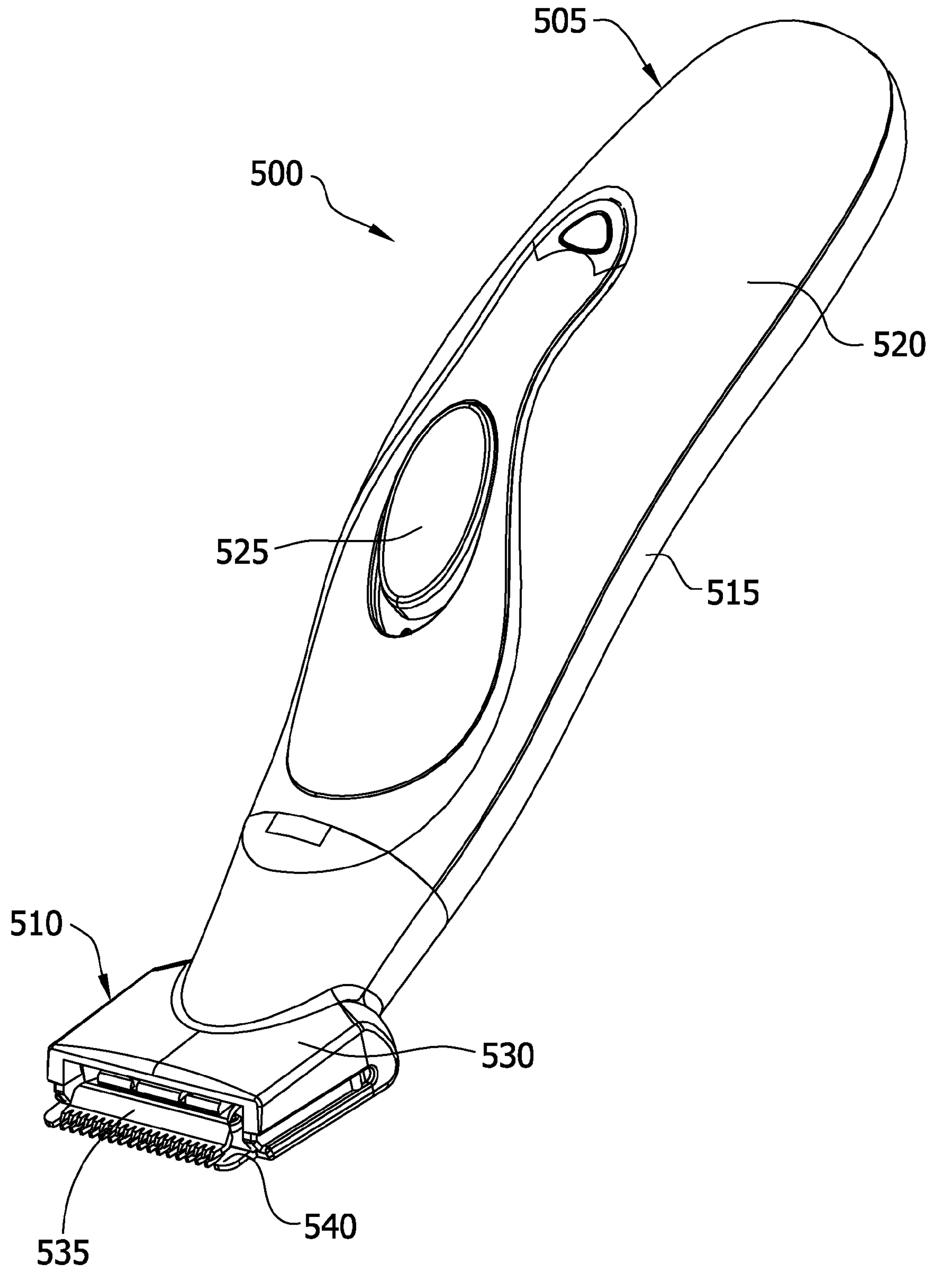
FIG. 5 is a perspective view of an exemplary hand-held, electrically operated hair groomer having a handle and a blade head assembly attached thereto.

Referring now to FIG. 5, an electric hand-held hair clipper or groomer constructed in accordance with yet another alternative embodiment of the present disclosure is indicated generally at 500. It is to be noted that the illustrated clipper or groomer is particularly configured for use as a hair trimmer to trim facial or body hair. However, it is understood that the illustrated clipper or groomer 500 may be configured for other uses, such as hair clipping, shaving and the like, in accordance with clippers or groomers generally known in the art without departing from the scope of this disclosure.

The clipper or groomer 500 broadly comprises a handle, indicated generally at 505, and a blade head assembly (e.g., configured for hair trimming), indicated generally at 510, with the handle and blade head assembly together broadly defining a housing for the clipper or groomer. In the illustrated embodiment, the blade head assembly 510 is removably attachable to the handle 505 to permit selective attachment and detachment of the blade head assembly 510 from the handle 505 for cleaning, replacement or interchangeability with other types of blade head assemblies. It is understood, however, that the blade head assembly 510 may be more permanently attached to the handle 505 (e.g., not intended for removal from the handle) without departing from the scope of this invention.

The handle 505 is suitably sized and shaped so that it is easily held in a user's hand. The illustrated handle 505 is elongate and relatively cylindrical and is of two-piece construction including a base 515 and a cover 520 affixed to the base to define an interior space (not illustrated) of the handle. The illustrated base 515 and cover 520 of the handle 505 is constructed of a light-weight, rigid plastic, but it is contemplated that the base and/or cover could alternatively be made from other suitable materials. It is also understood that the handle 505 may be suitably shaped other than as illustrated in FIG. 5, as long as the handle is sized and shaped for being held in a user's hand. The clipper or groomer can be selectively turned on and off using an on/off switch 525, mounted on the handle 505 and accessible exterior thereof.

The blade head assembly 510 includes a cover 530 and a pair of cutting blades 535, 540 disposed in part within the cover and extending in part exterior of the cover for trimming hair. In the illustrated embodiment, the cutting blades include a reciprocating blade 535 (broadly, a first cutting blade) that is capable of reciprocating movement relative to the cover 530 (and hence the housing of the clipper or groomer) and a stationary or fixed blade 540 (broadly, a second cutting blade) that is secured against movement relative to the cover 530 adjacent to and in face-to-face relationship (and more suitably sliding face-to-face contact) with the reciprocating blade 535. For example, the stationary blade 540 of FIG. 5 includes a number of openings (not illustrated) for receiving a corresponding number of guide posts (not illustrated) formed on the cover 530 to properly position and secure the stationary blade on the cover. It is contemplated that the second cutting blade 540 may also be capable of reciprocating movement relative to the cover 530 instead of being stationary. It is also understood that the clipper or groomer 500 may have more than one reciprocating cutting blade and one or more stationary blades, without departing from the scope of this invention.

In accordance with the present disclosure, the silver-containing alloy coating may be applied to, for example, the various components of the illustrated clipper or groomer, including, for example, the components that make up the reciprocating blade(s) and/or the fixed blade(s), and/or a comb that may be attached to the clipper or groomer (e.g., to the fixed blade thereof).

It is to be noted that that the particular design of the shavers, as well as clipper or groomer, detailed herein above may be other than herein described without departing from the scope of the present invention.

2. Silver-Containing Alloy Coating

As previously noted, the present disclosure is directed to a personal grooming device, such as a razor or shaver (e.g., an electric shaver, such as a rotary or foil shaver), or a clipper or groomer (e.g., an electric clipper or groomer), that includes a component (e.g., a cutting blade, a foil or screen present between the cutting blade and the user's skin, the clipper or groomer comb, or the fixed or reciprocating blade thereof, etc.) that has a silver-coating on a surface thereof which is designed for contacting a user's skin, wherein said coating (i) has anti-microbial properties, (ii) is tarnish resistant, and/or (iii) is hypoallergenic. Advantageously, such a coating may additionally or optionally impart a reduced coefficient of friction to the surface of which it is applied.

As further detailed elsewhere herein, the silver-containing alloy coating may be deposited by vapor deposition. The vapor deposition method may be physical vapor deposition (PVD) or chemical vapor deposition (CVD). Desirably, the silver-containing alloy is deposited as a layer or film on the surface of the component (i.e., the component surface designed for contacting the user's skin).

In one embodiment, the layer or film applied to the component surface comprises, or is in the form of, a silver-containing alloy, the alloy having a silver concentration of at least about 50 weight percent, at least about 60 weight percent, at least about 70 weight percent, at least about 80 weight percent, at least about 90 weight percent or more (e.g., about 92 weight percent, about 94 weight percent, about 96 weight percent, or even about 98 weight percent), based on the total weight of the alloy. For example, in such an embodiment, the alloy may have a silver concentration in the range of between at least about 50 weight percent and less than about 100 weight percent, such as between at least about 55 weight percent and less than about 95 weight percent, or between at least about 60 weight percent and less than about 90 weight percent, or between at least about 65 weight percent and less than about 85 weight percent. The silver-containing alloy may be tarnish resistant (as further detailed elsewhere herein). Additionally, or alternatively, the alloy may be a sterling silver alloy (as further detailed herein below).

In one particular embodiment, the layer or film applied to the component surface comprises, or is in the form of, a silver-containing alloy as disclosed in PCT Application Publication No. WO 2006/106282 (the entire content of which is incorporated herein by reference for all relevant purposes consistent with the present disclosure). Notably, the alloy disclosed therein is a tarnish resistant, sterling silver alloy, wherein a silver alloy is said to be a "sterling silver" alloy if it contains at least about 92.5% by weight or more silver and less than about 7.5% by weight of other metals, based on the total weight of the alloy. Although the sterling silver coating may contain more than 92.5% by weight (e.g., about 94 weight percent, about 95 weight percent, about 96 weight percent, about 97 weight percent, about 98 weight percent, or even about 99 weight percent, based on the total weight of the alloy), since silver is typically the most expensive component of the alloy, and/or since the other metals add to the material properties of the alloy (e.g., physical strength or hardness, and/or reducing tarnishing), silver is typically less than about 99 weight percent, about 98 weight percent, about 97 weight percent, about 96 weight percent, about 95 weight percent, or even about 94 weight percent, based on the total weight of the alloy. For example, in various embodiments the concentration of silver, relative to the total weight of the alloy, may be greater than about 92.5 weight percent and less than about 97 weight percent, or greater than about 92.75 weight percent and less than about 95 weight percent, or greater than about 93 weight percent and less than about 94 weight percent.

The silver alloy coating of the present invention may comprise alloying metals including, for example, indium, zinc, tin, and/or some combination thereof, to give an improved sterling silver alloy that is less susceptible to, for example, tarnishing by sulfidation of the silver component and oxidation. The silver alloy coating may also, or alternatively, include aluminum, magnesium, and/or a combination thereof. The silver alloy coating may also or alternatively include copper, manganese, iron, nickel, lithium, silicon, boron, phosphorus, titanium, iridium, cobalt, and/or combinations thereof.

Indium may be added, for example, to reduce silver sulfidation. Without being bound by a particular theory, it is thought that indium forms a replenishable oxide layer on the surface of a product manufactured from the alloy. This surface oxide layer is thin, on the order of nanometers thick. It protects the surface of the silver alloy coated component from sulfur in the atmosphere and from sulfur introduced by handling that would otherwise cause sulfidation and tarnishing. If the indium oxide surface layer is removed, for example, by polishing or scratching, indium in the silver quickly reacts with oxygen in the atmosphere to form a new replenishable surface oxide layer.

When present, indium is typically added to the silver-containing alloy in an amount no greater than about 2 percent by weight, based on the total weight of the alloy. For example, in one embodiment, indium is added in an amount between about 0.25% by weight and about 1.5% by weight, or between about 0.5% by weight and about 1.3% by weight, or between about 0.75% by weight and about 1.1% by weight, such as about 1% by weight. In one embodiment, indium is added in an amount between about 0.3% and about 1.1% by weight, such as about 0.7% by weight.

Zinc and/or tin may also, or alternatively, be added, for several reasons. For example, in conventional sterling silver, copper is added to improve the mechanical properties of silver, such as hardness, workability and the like. Zinc and tin have the same or similar effect in the silver alloy coating of the present invention. Zinc and/or tin may improve the mechanical properties of the alloy without being detrimental to the distinctive color of sterling silver. In particular, tin has been found, for example, to improve the flowability of the molten alloy in various processes, such as spinning. Without being held to a particular theory, it is also thought that zinc and tin may form replenishable oxides on the surface of the silver alloy, which protect the surface from sulfidation, much like indium.

In this regard it is to be noted that tin may have a detrimental physical and/or visual effect on the alloy, if added in too high of a concentration (e.g., when added in an amount of, for example, significantly more than about 5 percent by weight, tin may be detrimental to the color of a sterling silver alloy, such that it would not have the brightness, luster, and reflectivity of, for example, a traditional sterling silver alloy having, for example, about 92.5 weight percent silver and about 7.5 weight percent copper). Accordingly, the amount of tin is typically limited to no greater than about 5% by weight, and may suitably be less than about 4% by weight, about 3.5% by weight, about 3% by weight, about 2.5% by weight, or even about 2% by weight, based on the total weight of the alloy. In one embodiment, for example, tin may be added in an amount between about 2.5% and about 3.5% by weight, such as about 3% by weight.

When present, zinc is also typically added to the silver alloy in an amount no greater than about 5% by weight, based on the total weight of the alloy. For example, in various embodiments the zinc concentration may be less than about bout 4% by weight, about 3.5% by weight, about 3% by weight, about 2.5% by weight, or even about 2% by weight. In one embodiment, for example, zinc is added in an amount between about 2% by weight and about 3% by weight, such as about 2.5% by weight.

Depending upon the manner by which the alloy, or coating, is prepared and/or deposited or applied to the component surface, various other additives may be added to the alloy or coating composition (in order, for example, to make the deposition or application process easier and/or more efficient, to increase the adhesion strength between the component surface and the alloy layer, etc.). For example, in one embodiment, a grain refiner may also be added, in order to refine the grain size of the alloy. Refining the grain size helps to improve, for example, alloy workability, resistance of the alloy to tarnishing, and/or the surface appearance of products manufactured from or with the alloy. Grain refiners which may be added to the silver alloy include, for example, magnesium, aluminum, nickel, and boron, and/or some combination thereof.

Magnesium refines the grain size, improves workability of the alloy, and improves castability of the molten alloy. When added, magnesium is typically present in an amount no greater than about 2% by weight, more typically between about 0.02% by weight and about 0.1% by weight, such as about 0.06% by weight, based on the total weight of the alloy. Aluminum may be added to brighten the alloy and as a grain refiner to improve the workability of the alloy. Aluminum improves the luster and reflectivity of the alloy, as well. When added, aluminum is typically present in an amount no greater than about 3% by weight, and more typically is present in an amount between about 0.2% by weight and about 0.8% by weight, or between about 0.3% by weight and about 0.6% by weight, such as about 0.5% by weight, based on the total weight of the alloy.

Nickel may also, or alternatively, be added as a grain refiner. Nickel also improves oxidation and/or sulfidation resistance of the alloy. However, since nickel is an allergen, it is typically added in an amount no greater than about 0.05% by weight, based on the total weight of the alloy, (e.g., about 0.04% by weight, or about 0.02% by weight), but even at this level, nickel adequately refines the alloy grains.

Boron may also, or alternatively, be added as a grain refiner. Boron may be added, for example, in an amount between about 0.05 and about 0.25% by weight, or about 0.75 and about 0.2% by weight, or about 0.1 and about 0.15% by weight, such as, for example, about 0.115% by weight, based on the total weight of the alloy.

Other metal and/or compounds that may be additionally or alternatively added to the alloy, or coating, in varying amounts include copper, manganese, iron, lithium, silicon, phosphorus, titanium, iridium, and/or cobalt, as well as some combination thereof. It has been found, for example, that the addition of phosphorous can improve the flowability of the molten metal and therefore improve the ease of casting the alloy. Phosphorous may be added to the alloy in an amount, for example, between about 0.02% by weight and about 0.3% by weight, or about 0.05 and about 0.25% by weight, or about 0.1 and about 0.2% by weight, such as, for example, about 0.15% by weight, based on the total weight of the alloy. Lithium may also or alternative be added to improve the flowability of the molten metal, by reducing the viscosity thereof, and hence improving the castability of the alloy. Lithium may be added to the alloy in an amount, for example, between about 0.05% by weight and about 0.2% by weight, or about 0.075 and about 0.175% by weight, or about 0.1 and about 0.15% by weight, such as, for example, about 0.125% by weight, based on the total weight of the alloy. The remaining metals (i.e., copper, manganese, iron, silicon, titanium, iridium, and cobalt) may be added in relatively minor amounts, for example, typically no greater than about 1% by weight, or about 0.5% by weight, or about 0.1% by weight, or about 0.05% by weight (e.g., between about 0.05% by weight and about 0.1% by weight), based on the total weight of the alloy.

In this regard it is to be noted, however, that the sum of the concentrations of silver and the other alloying metals present is typically at least about 75 weight percent, at least about 80 weight percent, at least about 85 weight percent, at least about 90 weight percent, at least about 95 weight percent or more (e.g., about 96, about 97, about 98, about 99, or even about 100, weight percent). Accordingly, it is to be further noted that the concentrations of the above-noted alloying metals may be other than herein described without departing from the scope of the present invention.

In view of the foregoing, exemplary compositions of the silver-containing alloy (i.e., sterling silver alloys), suitable for use in accordance with the present disclosure, are provided herein below. In this regard it is to be noted, however, that these compositions are provided for illustration purposes, and therefore should not be viewed in a limiting scope. All percentages herein are percentages by weight:

| | |
|---|---|
| Embodiment 1 | |
| 93% | silver; |
| 1% | indium; |
| 3.6% | tin; |
| 2.2% | zinc; |
| 0.1% | iron; |
| 0.1% | manganese. |
| Embodiment 2 | |
| 93% | silver; |
| 1% | indium; |
| 3.6% | tin; |
| 2.2% | copper; |
| 0.1% | iron; |
| 0.1% | manganese. |
| Embodiment 3 | |
| 93.0% | silver; |
| 0.115% | copper; |
| 3.6% | tin; |
| 2.2% | zinc; and |
| 1.0% | indium. |
| Embodiment 4 | |
| 92.8% | silver; |
| 0.15% | copper; |
| 3.05% | tin; |
| 2.4% | zinc; |
| 1.0% | indium; |
| 0.05% | nickel; |
| 0.05% | magnesium; |

-continued

| | |
|---|---|
| 0.5% | aluminum. |
| Embodiment 5 | |
| 93% | silver; |
| 1% | indium; |
| 3.6% | tin; |
| 2.235% | zinc; |
| 0.115% | copper; |
| 0.05% | nickel. |
| Embodiment 6 | |
| 93% | silver; |
| 1% | indium; |
| 2.9% | tin; |
| 2.935% | zinc; |
| 0.115% | copper; |
| 0.05% | nickel. |
| Embodiment 7 | |
| 93% | silver; |
| 1% | indium; |
| 4.5% | tin; |
| 1.335% | zinc; |
| 0.115% | copper; |
| 0.05% | nickel. |
| Embodiment 8 | |
| 93% | silver; |
| 1% | indium; |
| 3.6% | tin; |
| 2.35% | copper; |
| 0.05% | nickel. |
| Embodiment 9 | |
| 93% | silver; |
| 1% | indium; |
| 3.6% | tin; |
| 1.235% | zinc; |
| 0.115% | copper; |
| 0.05% | nickel; |
| 1% | aluminum. |
| Embodiment 10 | |
| 93% | silver; |
| 1% | indium; |
| 3% | tin; |
| 2.235% | zinc; |
| 0.115% | copper; |
| 0.05% | nickel; |
| 0.6% | aluminum. |
| Embodiment 11 | |
| 93% | silver; |
| 1% | indium; |
| 3% | tin; |
| 2.235% | zinc; |
| 0.05% | nickel; |
| 0.6% | aluminum; |
| 0.115% | boron. |
| Embodiment 12 | |
| 93% | silver; |
| 1% | indium; |
| 3% | tin; |
| 2.035% | zinc; |
| 0.05% | nickel; |
| 0.6% | aluminum; |
| 0.115% | boron; |
| 0.2% | lithium. |
| Embodiment 13 | |
| 93% | silver; |
| 1% | indium; |
| 3% | tin; |
| 2.035% | zinc; |
| 0.05% | nickel; |

-continued

| | |
|---|---|
| 0.6% | aluminum; |
| 0.115% | boron; |
| 0.2% | magnesium. |

Further exemplary compositions of the non-sterling silver-containing alloy (i.e., having between about 50 weight percent and about 92.5 weight percent silver) suitable for use in accordance with the present disclosure are provided herein below:

| Embodiment 14 | |
|---|---|
| 80% | silver; |
| 5% | indium; |
| 8.6% | tin; |
| 6.2% | zinc; |
| 0.1% | iron; |
| 0.1% | manganese. |
| Embodiment 15 | |
| 86% | silver; |
| 4% | indium; |
| 6.6% | tin; |
| 3.2% | copper; |
| 0.1% | iron; |
| 0.1% | manganese. |
| Embodiment 16 | |
| 70% | silver; |
| 0.15% | copper; |
| 8.05% | tin; |
| 7.4% | zinc; |
| 7.0% | indium; |
| 0.05% | nickel; |
| 0.05% | magnesium; |
| 0.5% | aluminum. |

It is to be noted that selection of the various metals and/or compounds to be included in the silver-containing alloy of the present disclosure, and/or the concentration thereof, may be optimized in order to achieve the maximum anti-microbial effect, the maximum tarnish resistance, the maximum hypoallergenic effect, the maximum wear character, the maximum reduction of friction coefficient, or some optimum combination thereof, using means generally known in the art, without departing from the scope of the present invention.

3. Vapor Phase Deposition

The tarnish resistant, hypoallergenic, and/or antimicrobial silver-containing alloy coating may be applied to the desired metal component of the personal grooming device using means generally known in the art. Desirably, however, the alloy is applied to the component, or components, using vapor phase deposition techniques, and more specifically physical vapor deposition (PVD) or chemical vapor deposition (CVD) techniques, known in the art. The specific process conditions and/or process techniques may vary depending, for example, on (i) the composition and/or design of the component to which it is to be applied, and/or (ii) the composition of the alloy itself, and/or (iii) the thickness, or some other property, of the deposited layer of the alloy itself. For example, different process conditions and/or techniques may be used for components containing different metals or having different metallic compositions. Additionally, in order to achieve the desired hypoallergenic effect when deposited on a metal component, the thickness of the deposited layer of the alloy may need to be increased as the concentration of the nickel present in the metal component increases, in order to form a sufficient barrier to the nickel (i.e., to prevent or significant limit any migration of the nickel therethrough, and thus prevent or significantly limit contact between the nickel and the user's skin).

Generally speaking, the vapor deposition (e.g., PVD or CVD) process includes evaporative deposition, sputtering, and pulsed laser deposition. In one suitable embodiment, a PVD process is used which involves magnetron sputtering enhanced by an auxiliary plasma booster. This process may be accomplished, for example, in a TDS 400 or TSD 800 model device, which are manufactured by the H.E.F. group (Hydromécanique et Frottement, ZI Sud, rue Benoit Fourneyron, F-42166 Andrézieux-BouthéOn Cedex, France), using a coating target reference number of, for example, CME/450/8. The process cycle time may be optimized for a given application or desired result, but typically it is between about 1 and about 3 hours, or about 1.5 and about 2.5 hours, the duration being dependent, for example, upon the particular component being coating, component size, composition, and design. The deposition or sputtering temperature may also be optimized for a given application or desired result, but sputtering is suitably carried out at a process temperature between about 90° C. and about 150° C., or between about 100° C. and about 140° C., the temperature being dependent, for example, upon the particular component being coated.

In this regard it is to be noted that the upper temperature of the sputtering process is, at least in part, a function of substrate material/composition and may be higher in some embodiments than 150° C. (e.g., about 200° C., about 300° C., about 400° C., or about even 500° C., depending upon the substrate composition). The sputtering flux, plasma density, and bias voltage may also be adjusted or optimized for a given application or desired result (e.g., dependent upon the component composition, for example).

As noted above, the process conditions may be optimized for a given application or desired result, including, for example, the thickness of the film or layer or coating that is to be formed on the surface of the personal grooming device component. For example, in various embodiments, the average thickness of this layer may be greater than about 0.01 microns, about 0.1 microns, about 1 micron, about 3 microns or even about 5 microns, and less than about 10 microns (e.g., about 9 microns, about 8 microns, about 7 microns, or even about 6 microns), as measured or determined using means known in the art. For example, the thickness may, in various embodiments, be between about 0.01 and about 10 microns, or about 0.1 and about 8 microns, or about 0.2 and about 6 microns, or about 0.3 and about 4 microns, or about 0.4 and about 2 microns, or even about 0.5 and about 1.5 microns.

The process conditions, and/or the composition of the alloy itself, may additionally or alternatively be optimized, for example, in order to achieve a desired hardness of the film or layer or coating. For example, in various embodiments this hardness may be at least about 200 Vickers (Hv), at least about 250 Hv, at least about 300 Hv, at least about 350 Hv, or even at least about 400 Hv, under a load of about 5 mN (as determined or measured using means known in the art, for example, ISO 14577-1). Suitably, the microhardness may, in various embodiments, be between about 200 Hv and about 400 Hv, such as for example about 300 Hv or about 350 Hv.

4. Coated Components

As previously noted, the present disclosure is directed to a personal grooming device wherein one or more components thereof are coated on a surface designed for contact with the human skin. The present disclosure is also directed to a grooming device wherein one or more components thereof are coated on a surface designed for contacting the skin of an animal, such as during the act of pet grooming. Accordingly, such devices may include, for example, razors or shavers, including electric razors or shavers (e.g., rotary or foil shavers), as well as clippers or groomers. Suitable components of such devices may include, for example, various metal components (e.g., foils, cutters, screws, cutter base plates, trimmers, rotary heads, rotary blades, etc.).

In this regard it is to be noted that the particular personal grooming device, and/or component thereof, may be other than herein described without departing from the intended scope of the present disclosure.

5. Performance Properties

As previously noted, the silver-containing alloy of the present disclosure may be used to form a layer or film or coating on a device, thus imparting improved antimicrobial properties, and/or enhanced tarnish resistance, and/or improved hypoallergenic properties, thereto. Such properties may be determined or measured using means generally known in the art. For example, with respect to the hypoallergenic and antimicrobial properties achieved by the silver-containing alloy, such properties may be measured or evaluated as follows:

a. Hypoallergenic Properties

Hypoallergenic properties may be evaluated, for example, by means of evaluating skin allergenic contact dermatitis (skin allergenic reaction) resulting from the contact of a non-coated versus a coated device component. Acceptance criteria characterized by means of an allergenic patch test (TRUE test), using means known in the art. Additionally, or alternatively, performance may be evaluated and compared visually (i.e., visual evaluation per the Patch test; chromomeric test, which measures skin color; and/or laser doppler, which measures red blood cell movement). The chromomeric and laser doppler biometric methods are applicable for measuring reactions of “control” (i.e., non-coated components) containing less than about 10 weight percent nickel.

Additionally, it is to be noted that, in one particular embodiment, the coated component is prepared (e.g., the alloy composition and/or the thickness of the deposited film or layer or coating are optimized) in order to ensure that it does not release more than about 0.5 micrograms of nickel per square centimeter per week (e.g., less than about 0.45 micrograms, less than about 0.4 micrograms, less than about 0.35 micrograms, or even less than about 0.3 micrograms), during a test period of about 2 years under normal loading (as determined per European Nickel Directive 94/27/EC). Nickel release may also be evaluated in accordance with known methods BS EN 1811:1999 and BS EN 12472:1999.

b. Antimicrobial Properties

The antimicrobial properties of the resulting component may be optimized, for example, in order to ensure that the value of antimicrobial activity is not less than about 2 log or about 3 log; that is, the antimicrobial efficacy is at least about 99% or 99.9%. Stated another way, the ability of the coating to reduce the quantity and population of bacterial cells, using, for example, two different test organisms—i.e., *staphylococcus aureus* ATCC6538P and *Escherichia coli* ATCC873—at 24 hours, as compared to an untreated control, is desirably at least about 99%. Such results may be determined and/or verified using means known in the art, including, for example, test method JIS Z-2180:200 (which tests for antimicrobial activity and efficacy), and/or ASTM E2180 (which determines the activity of incorporated antimicrobial agents in polymer or hydrophobic materials). Antimicrobial activity may be measured or calculated as follows:

$$R=[\log(B/A)-\log(C/A)]=[\log(B/C)],$$

Where

R=antimicrobial activity;

A=mean bacterial count on PRA control sample at time zero;

B=mean bacterial count on PRA control sample after 24 hours; and,

C=mean bacterial count on test piece after 24 hours.

The following Examples illustrate various features of the present disclosure. Other features within the scope of the appended claims will be apparent to a skilled artisan considering the specification or practice of the disclosure provided herein. It is therefore intended that the specification, together with the Examples, be considered exemplary only, with the scope and spirit of the disclosure being indicated by the claims, which follow the Examples.

EXAMPLES

Example 1

Coefficient of Friction Comparison of Foil Coated with Silver Alloy Coating v. Conventional (Non-Coated) Nickel Foil In this Example, a silver-containing alloy coating was applied by vapor deposition to a nickel-containing foil of a commercially available electric foil razor. The components and concentrations in weight percent of the silver-containing alloy were:

93% Silver;

5% Indium;

1% Tin;

0.5% Magnesium; and 0.5% Zinc.

Figure 6:
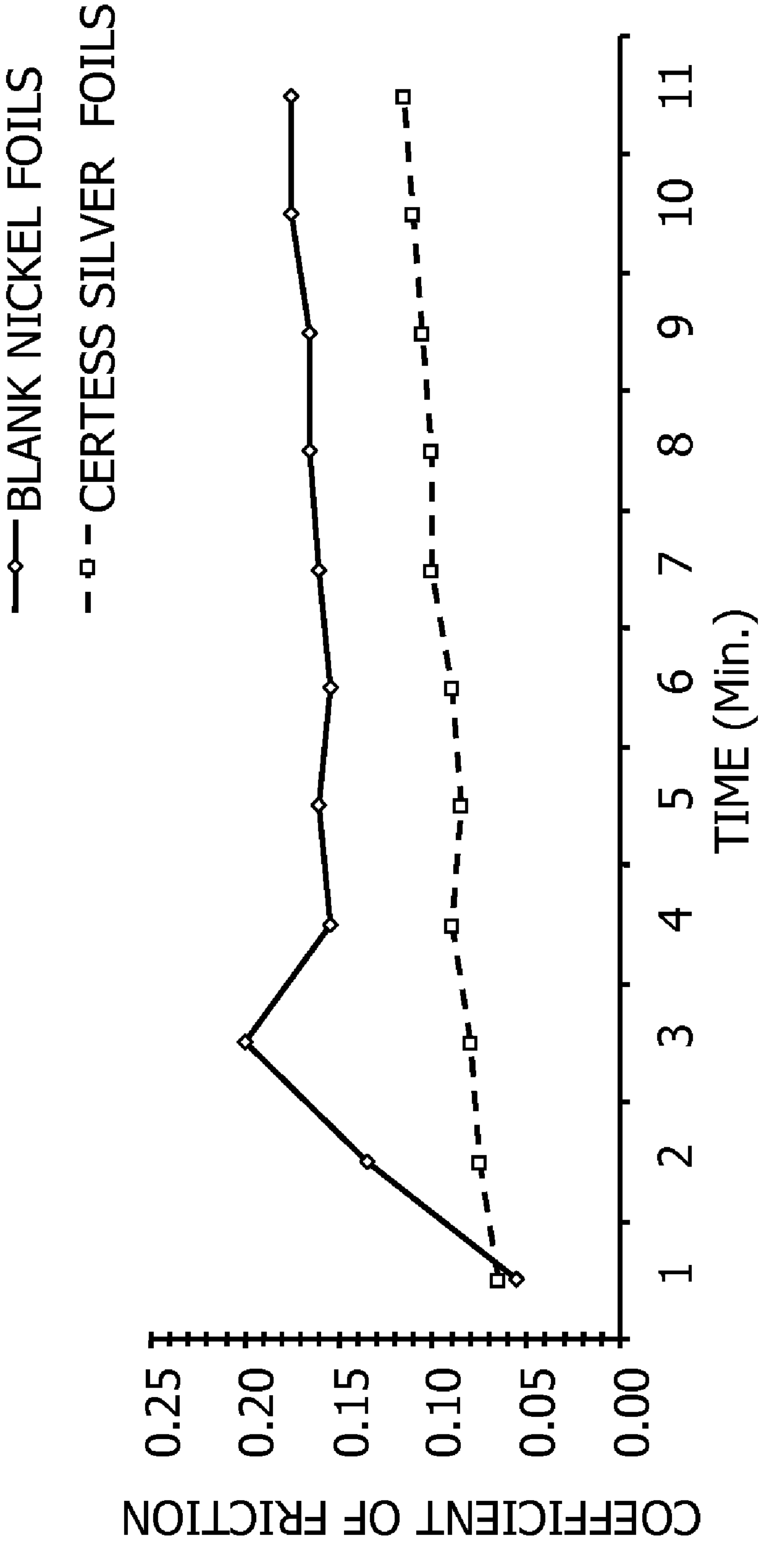
FIG. 6 is a graph that illustrates the lower coefficient of friction of a silver-coated foil of the present disclosure compared to a conventional uncoated foil (as further discussed in Example 1, below).

The coated foil and an otherwise identical non-coated foil were then tested for coefficient of friction according to ASTM G133-05 (at a temperature of about 18° C. and a humidity level between about 50 and 52%). The results of this testing are illustrated in the graph of FIG. 6, which indicates that a silver-coated foil prepared in accordance with the present disclosure may have a coefficient of friction that is about 42% lower than the coefficient of friction for the non-coated foil.

Example 2

Silver Alloy Coating Hardness

In this Example, a silver-containing alloy coating was applied by vapor deposition to a nickel-containing foil of a commercially available electric foil razor. The components and concentrations in weight percent of the silver-containing alloy were:

93% Silver;

5% Indium;

1% Tin;

0.5% Magnesium; and 0.5% Zinc.

The resulting coated foil was the tested for microhardness under a load of 5 mN according to ISO 14577-1. The test results indicate that the coated foil had a hardness of 435 Hv ±45.

Example 3

Anti-Microbial Efficacy of Silver Alloy Coating

In this Example, a portion of a commercially available nickel foil was coated with a silver-containing alloy coating by vapor deposition. The components and concentrations in weight percent of the silver-containing alloy were:

93% Silver;
5% Indium;
1% Tin;
0.5% Magnesium; and
0.5% Zinc.

The coated portion of the nickel foil, a control, and a portion of a commercially available, non-coated nickel foil were tested for anti-microbial efficacy according to the test methodology of JIS Z 2801:2000, using *Staphylococcus aureus* (Table 1) and *Escherichia coli* (Table 2). The control is a part having an initial bacteria count.

The results of this testing are provided in Tables 1 and 2, below. The test results indicate that a silver alloy coated foil of the present disclosure can have a Antimicrobial Efficacy level (99.99%) which meets the requirements as specified in JIS Z 2180:2000 (kill % of 99%).

TABLE 1

JIS Z 2801: 2000 using *Staphylococcus aureus*

| Test Sample | Mean Bacterial Count: Initial Count | Mean Bacterial Count: 24 hr count | Antibacterial Activity# | % Kill |
|---|---|---|---|---|
| Control | $3.9 \times 10^5$ | $2.2 \times 10^5$ | — | — |
| Silver Coating | — | <10 | >4.34 | >99.99 |
| Non-coated surface | — | $1.3 \times 10^5$ | 0.23 | 40.9 |

(See Note in Table 2, below)

TABLE 2

JIS Z 2801: 2000 using *Escherichia coli*

| Test Sample | Mean Bacterial Count: Initial Count | Mean Bacterial Count: 24 hr count | Antibacterial Activity# | % Kill |
|---|---|---|---|---|
| Control | $3.4 \times 10^5$ | $2.2 \times 10^5$ | — | — |
| Silver Coating | — | <10 | >4.4 | >99.99 |
| Non-coated surface | — | $3 \times 10^5$ | 0.92 | 88 |

#Note:
The bacterial counts obtained (shown as a geometric mean), together with the antibacterial activity (shown as a Log10 reduction) and the kill rate (shown as a percentage), are given in Table 1 (*Staphylococcus aureus*) and Table 2 (*Escherichia coli*). The antibacterial activity was calculated as follows:
R = [log (B/A) − log(C/A) = [log(B/C)]
where,
R = antimicrobial activity
A = mean bacterial count on control sample at time zero
B = mean bacterial count on control sample after 24 hours
C = mean bacterial count on test piece after 24 hours

Example 4

Tarnish Resistance of Silver Alloy Coating

In this Example, a commercially available nickel foil was coated with a silver-containing alloy coating by vapor deposition. The components and concentrations in weight percent of the silver-containing alloy were:

93% Silver;
5% Indium;
1% Tin;
0.5% Magnesium; and
0.5% Zinc.

The silver alloy coated foil of the present disclosure and a conventional sterling silver control were then tested for tarnish resistance. The control was a solid sterling silver piece comprising silver (92.5 weight percent) and copper (7.5 weight percent). The conventional sterling silver control exhibited interference tarnishing colors at 160 minutes of testing, while the foil coating with the silver alloy coating of the present disclosure exhibited initial tarnishing at 240 minutes. The foil coating with the silver alloy coating of the present disclosure also exceeds the requirements (2 hours of testing) of ISO 4538, as compared to standard sterling silver. In addition, the test results indicate that a coated foil of the present disclosure can have a delay in tarnish type reactions of more than 25%, as compared to that of standard sterling silver, when tested per ISO 4538 requirements.

Having described the invention in detail, it will be apparent that modifications and variations are possible without departing from the scope of the invention defined in the appended claims.

When introducing elements of the present invention or the particular embodiments(s) thereof, the articles “a”, “an”, “the” and “said” are intended to mean that there are one or more of the elements. The terms “comprising”, “including” and “having” are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and depicted in the accompanying drawings shall be interpreted as illustrative and not in a limiting sense.

What is claimed is:

1. A personal grooming device comprising a metal component having a coating directly formed on a surface of the metal component for contacting the skin, wherein the coating is a tarnish resistant, antimicrobial coating comprising an alloy comprising silver and indium, wherein the alloy has a concentration of silver of at least about 50 weight percent, based on the total weight of the alloy and wherein said device is selected from the group consisting of a shaver, a hair clipper, and a razor.

2. The personal grooming device of claim 1, wherein the coating has a thickness of at least about 0.1 microns.

3. The personal grooming device of claim 1, wherein the coating has a thickness of less than about 10 microns.

4. The personal grooming device of claim 1, wherein the coating has a hardness of at least about 200Hv, under a load of about 5 mN.

5. The personal grooming device of claim 1, wherein the coating has a hardness of at least about 300Hv, under a load of about 5 mN.

6. The personal grooming device of claim 1, wherein the coating has a silver concentration of at least about 60 weight percent, based on the total weight of the alloy.

7. The personal grooming device of claim 1, wherein the coating has a silver concentration of at least about 70 weight percent, based on the total weight of the alloy.

8. The personal grooming device of claim 1, wherein the coating has a silver concentration of at least about 80 weight percent, based on the total weight of the alloy.

9. The personal grooming device of claim 1, wherein the coating has a silver concentration of at least about 90 weight percent, based on the total weight of the alloy.

10. The personal grooming device of claim 1, wherein the coating has a silver concentration of at least about 92.5 weight percent, based on the total weight of the alloy.

11. The personal grooming device of claim 1, wherein the coating has a silver concentration of at least about 92.75 weight percent and less than about 95 weight percent, based on the total weight of the alloy.

12. The personal grooming device of claim 1, wherein the coating comprises an alloy of silver, indium and a metal selected from the group consisting of zinc, tin, and/or a combination thereof.

13. The personal grooming device of claim 12, wherein the sum of the concentrations of silver, indium and a metal selected from the group consisting of zinc, tin, or a combination thereof is at least about 75 weight percent, based on the total weight of the alloy.

14. The personal grooming device of claim 1, wherein the coating comprises an alloy of silver, indium and a metal selected from the group consisting of aluminum, magnesium, and/or a combination thereof.

15. The personal grooming device of claim 14, wherein the sum of the concentrations of silver, indium and a metal selected from the group consisting of aluminum, magnesium, and/or a combination thereof is at least about 75 weight percent, based on the total weight of the alloy.

16. The personal grooming device of claim 1, wherein the coating comprises an alloy of silver, indium and a metal selected from the group consisting of copper, manganese, iron, nickel, lithium, silicon, boron, phosphorus, titanium, iridium, cobalt, and/or a combination thereof.

17. The personal grooming device of claim 16, wherein the sum of the concentrations of silver, indium and a metal selected from the group consisting of copper, manganese, iron, nickel, lithium, silicon, boron, phosphorus, titanium, iridium, cobalt, and/or a combination thereof is at least about 75 weight percent, based on the total weight of the alloy.

18. The personal grooming device of claim 1, wherein the device is a shaver.

19. The shaver of claim 18, wherein the shaver comprises a shaver component, wherein said shaver component is suitable for use in an electric shaver.

20. The shaver of claim 19, wherein said shaver component is a metal shaver component suitable for use in a foil shaver, said metal component being selected from the group consisting of an outer cutter foil, an inner cutter, and a trimmer.

21. The shaver of claim 18, wherein the shaver comprises a metal shaver component, wherein said metal shaver component is suitable for use in a rotary shaver, said metal component being is selected from the group consisting of a rotary shaving head, a trimmer, and a rotary cutting blade.

22. The personal grooming device of claim 1, wherein the device is a hair clipper.

23. The clipper or groomer of claim 22, wherein said hair clipper metal component is a metal component selected from the group consisting of a reciprocating blade and a fixed blade.

24. The personal grooming device of claim 1, wherein the coated metal component is designed for contacting the human skin.

25. The personal grooming device of claim 1, wherein the coated metal component is designed for contacting the skin of an animal.

26. The personal grooming device of claim 1, wherein the personal grooming device component comprises nickel, and further wherein the coating present therein has a nickel release rate of less than about 0.5 micrograms per square centimeter per week.

27. The personal grooming device of claim 1, wherein the coating has an antimicrobial efficacy of at least about 99%.

* * * * *